United States Patent
Kim et al.

(10) Patent No.: US 11,340,945 B2
(45) Date of Patent: May 24, 2022

(54) MEMORY CONGESTION AWARE NUMA MANAGEMENT

(71) Applicant: VMware, Inc., Palo Alto, CA (US)

(72) Inventors: Seongbeom Kim, Sunnyvale, CA (US); Jagadish Kotra, State College, PA (US); Fei Guo, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 409 days.

(21) Appl. No.: 15/191,415

(22) Filed: Jun. 23, 2016

(65) Prior Publication Data

US 2017/0371777 A1 Dec. 28, 2017

(51) Int. Cl.
*G06F 9/50* (2006.01)

(52) U.S. Cl.
CPC ...... *G06F 9/5016* (2013.01); *G06F 2209/502* (2013.01)

(58) Field of Classification Search
CPC .... G06F 12/023; G06F 3/0604; G06F 3/0631; G06F 3/064; G06F 3/0647; G06F 3/0665; G06F 3/0673; G06F 9/5016; G06F 12/1009; G06F 2212/152; G06F 2212/657
See application file for complete search history.

(56) References Cited

U.S. PATENT DOCUMENTS

| | | | |
|---|---|---|---|
| 6,347,362 B1* | 2/2002 | Schoinas | G06F 11/3006 711/147 |
| 8,918,392 B1* | 12/2014 | Brooker | G06F 17/30159 370/355 |
| 2003/0009640 A1* | 1/2003 | Arimilli | G06F 12/0813 711/147 |
| 2010/0121865 A1* | 5/2010 | Vaid | G06F 17/30979 707/758 |
| 2014/0136773 A1* | 5/2014 | Michalak | G06F 3/0655 711/105 |

OTHER PUBLICATIONS

Liu et al., "Optimizing Virtual Machine Consolidation Performance on NUMA Server Architecture for Cloud Workloads," SCA 2014, Proceeding of the 41st Annual International Symposium on Computer Architecture, pp. 325-336.

* cited by examiner

*Primary Examiner* — Arpan P. Savla
*Assistant Examiner* — Eric T Loonan
(74) *Attorney, Agent, or Firm* — Patterson + Sheridan, LLP (57) ABSTRACT

In a computer system having multiple memory proximity domains including a first memory proximity domain with a first processor and a first memory and a second memory proximity domain with a second processor and a second memory, latencies of memory access from each memory proximity domain to its local memory as well as to memory at other memory proximity domains are probed. When there is no contention, the local latency will be lower than remote latency. If the contention at the local memory proximity domain increases and the local latency becomes large enough, memory pages associated with a process running on the first processor are placed in the second memory proximity domain, so that after the placement, the process is accessing the memory pages from the memory of the second memory proximity domain during execution.

20 Claims, 5 Drawing Sheets

MEMORY CONGESTION AWARE NUMA MANAGEMENT

BACKGROUND

A NUMA (Non Uniform Memory Access) system has multiple memory proximity domains, referred to as "NUMA nodes," each of which is a group of processors and memory. In general, a processor's access to memory of its local NUMA node is faster than to memory of remote NUMA nodes. Based on this, existing NUMA policy is designed to maximize memory locality, i.e., maximize the ratio of memory accesses that happen at a local NUMA node in relation to all memory accesses.

A recent paper by Liu et al., "Optimizing Virtual Machine Consolidation Performance on NUMA Server Architecture for Cloud Workloads," ISCA 2014, Proceeding of the 41st Annual International Symposium on Computer Architecture, pp. 325-336, however, posits that the benefit of local memory depends on the degree of resource contention. If the contention to the local NUMA node is high, it teaches that performance improvements can be achieved by diverting memory traffic to remote NUMA nodes. The paper demonstrates that previous assumptions of the local NUMA node always being the best place to allocate memory is naïve and simplistic and may miss opportunity for further optimization.

The paper discloses a technique to detect resource contention that is based on performance counters that are on-chip to calculate instructions per cycle (IPC) or last level cache (LLC) hit/miss rates. The use of performance counters, however, would be inconvenient because it may not be possible to reserve the performance counters for the purpose of NUMA management. Also, the performance counter alone is not enough to capture the distance between NUMA nodes. For example, if there are two remote NUMA nodes with the same, low, degree of contention, allocating memory on the farther of the two remote NUMA nodes would not be beneficial and may even be harmful to performance.

SUMMARY

Embodiments provide a more practical technique to evaluate contention at NUMA nodes for process and memory placement, so that better process and memory scheduling decisions can be made in NUMA systems. According to embodiments, latencies of local and remote memory access are probed at each NUMA node. When there is no contention, the local memory access latency will be less than the remote memory access latency. If the contention at the local NUMA node increases, the local memory access latency may become large enough so that it becomes beneficial to allocate/rebalance memory to a remote NUMA node. The benefits of using the latency probing technique are its simplicity and accuracy. It does not consume performance counters and reflects inter-node distance inherently. It is also capable of capturing contentions on the NUMA interconnect, which cannot be done by using performance counter metrics like IPC or LLC hits/misses.

A method of managing the placement of memory pages associated with a process executing in one of multiple memory proximity domains of a NUMA system, according to one embodiment, includes the steps of measuring latencies of memory accesses to memory of a first memory proximity domain and memory of a second memory proximity domain by a processor of the first memory proximity domain and also by a processor of the second memory proximity domain, and placing memory pages associated with a process running on the processor of the first memory proximity domain, in the second memory proximity domain based on the measured latencies, so that after the placement, the process running on the processor of the first memory proximity domain is accessing the memory pages from the memory of the second memory proximity domain during execution.

As used herein, the term "memory proximity domain" means a node of a computer system that includes at least one processor and memory in close proximity to each other relative to other processors and memory of the computer system. One example of such memory proximity domain is a NUMA node.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
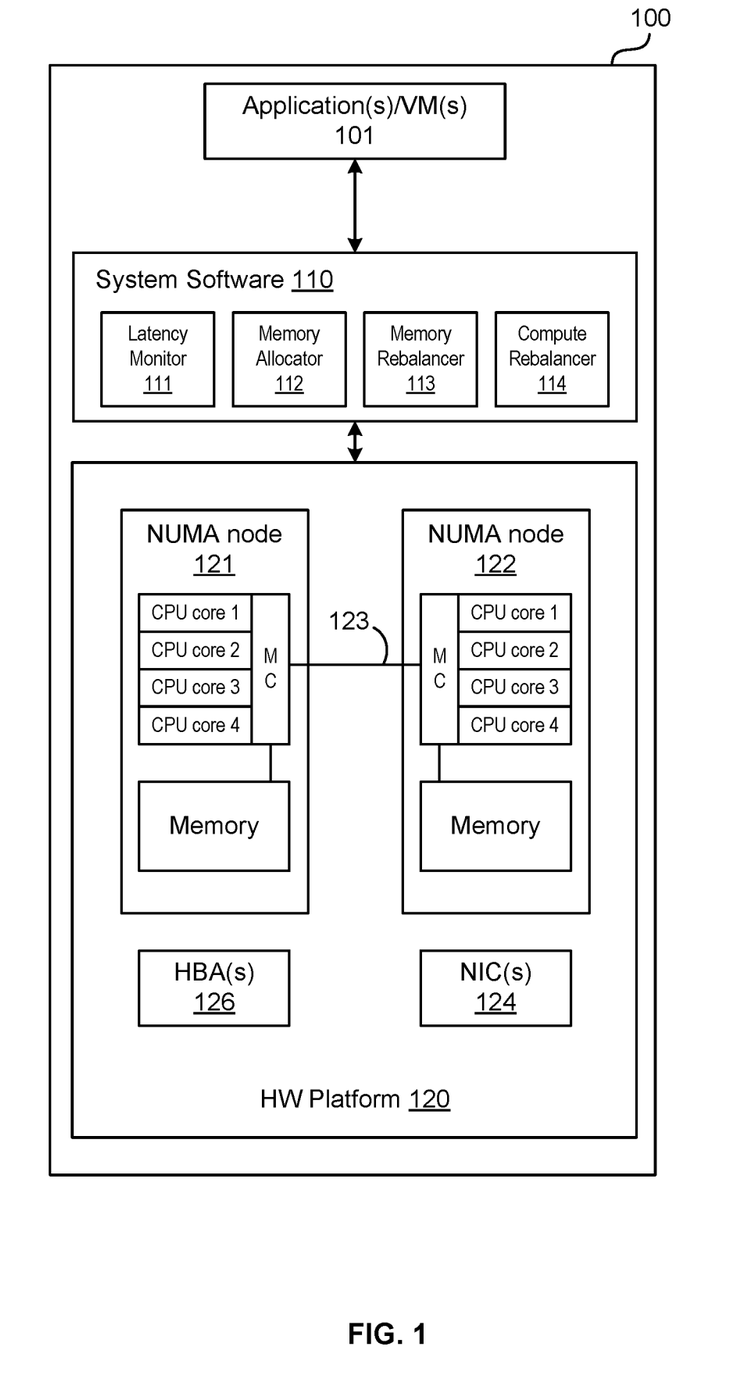
FIG. 1 depicts a block diagram of a non-uniform memory access (NUMA) computer system in which embodiments may be implemented.

FIG. 1 is a block diagram of a computer system 100 in which one or more embodiments of the present invention may be implemented. Computer system 100 includes one or more applications 101 that are running on top of system software 110. System software 110 includes a plurality of software layers including a kernel that manages hardware resources provided by a hardware platform 120 through various drivers. In one embodiment, system software 110 is an operating system (OS), such as operating systems that are commercially available. In another embodiment, system software 110 is a virtualization software layer, commonly known as a hypervisor, which supports virtual machine(s) 101 running thereon. One example of the virtualization software layer may be a hypervisor included as a component of VMware's vSphere® product, which is commercially available from VMware, Inc. of Palo Alto, Calif. In such an embodiment, each of virtual machine(s) 101 is supported by a virtual hardware platform implemented by the hypervisor, and a guest operating system (OS) is installed in the virtual machine to support the running of applications within the virtual machine. Guest OS may be any of the well-known commodity operating systems, such as Microsoft Windows®, Linux®, and the like.

Hardware platform 120 includes NUMA nodes 121, 122, one or more network interface cards (NICs) 124 that connect computer system 100 to a network and one or more host bus adapters 126 through which computer system 100 accesses a persistent storage device such as a solid state drive (SSD) and hard disk drive (HDD). Each of the NUMA nodes includes a multi-core processor (shown as CPU cores 1-4), a memory controller (MC), and memory, e.g., dynamic random access memory (DRAM), which is accessed by the CPU cores through their respective memory controller. In the case of local memory access, the CPU cores of a particular NUMA node access the memory of that node through the memory controller on that NUMA node. In the case of remote memory access, the CPU cores of a particular NUMA node access the memory of a different NUMA node through the memory controllers of both NUMA nodes, which communicate with each other through an interconnect 123, e.g., a NUMA interconnect. The embodiment illustrated in FIG. 1 includes two NUMA nodes and a single interconnect. Further embodiments may include additional NUMA nodes and additional interconnects, such that an interconnect is provided between each different pair of NUMA nodes. In addition, the NUMA node configuration may be different from the one illustrated in FIG. 1. For example, each NUMA node may consist of multiple processors (single-core or multi-core). Other NUMA node configurations include one where a single processor maps to two NUMA nodes. In general, the mapping between the number of processors and the number of NUMA nodes is flexible.

In the embodiments, system software 110 further includes the following modules: latency monitor 111, memory allocator 112, memory rebalancer 113, and compute rebalancer 114. Latency monitor 111 is a system software kernel module that is periodically executed to perform the probing of latencies of local and remote memory accesses at each NUMA node and stores the latencies in a latency profile table (which may be maintained in NUMA node 121 and/or 122). Memory allocator 112 is a module in a memory scheduler of system software 120 and determines whether new memory allocations should be placed in a local NUMA node or a remote NUMA node based on the latencies probed by latency monitor 111. Memory rebalancer 113 and compute rebalancer 114 are modules of a NUMA scheduler module, which is executed periodically to examine the latencies probed by latency monitor 111. If there is an imbalance in contention of resources between two NUMA nodes, the NUMA scheduler module executes either memory rebalancer 113 to migrate allocated memory pages between the two NUMA nodes or compute rebalancer 114 to migrate processes and their associated memory pages between the two NUMA nodes. In one embodiment, the NUMA scheduler module executes compute rebalancer 114 first, and if the imbalance still exists, then memory rebalancer 113.

In one embodiment, migrating memory pages between a first NUMA node and a second NUMA node includes the steps of halting the process associated with the memory pages in the first NUMA node, allocating new memory pages in the second NUMA node, and copying contents of the memory pages in the first NUMA node into the newly allocated memory pages in the second NUMA node, modifying page tables of the halted process so that migrated memory pages are accessed from the second NUMA node, and then resuming the process. Migration of memory pages may also be asynchronous in which destination page creation and copying can happen in parallel with the process execution. The migration of a process between a first NUMA node and a second NUMA node includes the steps of halting the process in the first NUMA node, and then resuming the process in the second NUMA node.

Figure 2:
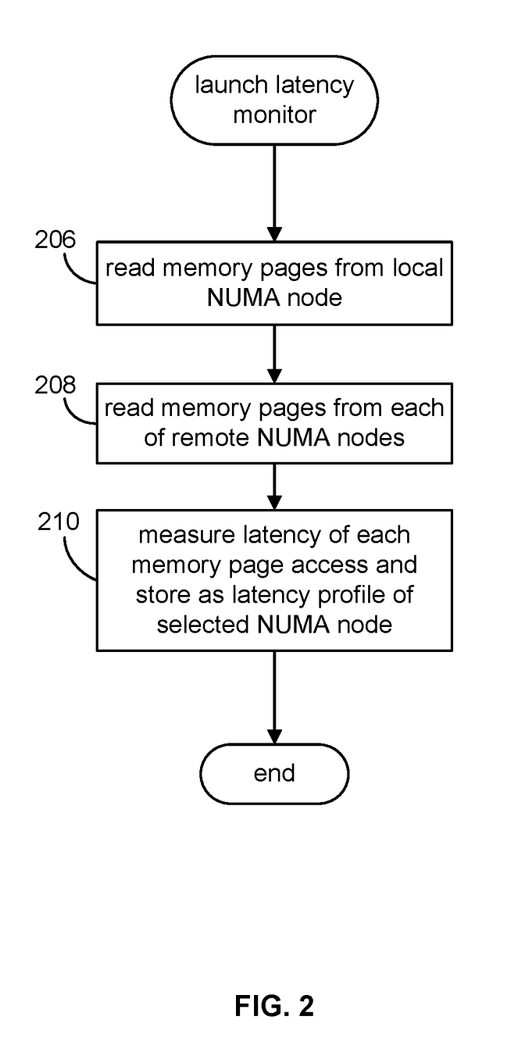
FIG. 2 depicts a flow diagram of a method for probing latencies of local and remote memory accesses, according to an embodiment.

FIG. 2 depicts a flow diagram of a method for probing latencies of local and remote memory accesses, according to an embodiment. This method is periodically executed for each NUMA node by latency monitor 111 according to a fixed time interval, e.g., 100 millisecond or 1 second. Another way of triggering this method is to count memory allocations or LLC misses (or some other metric), and perform the probing when there have been enough memory allocations or LLC misses (or when some other metric meets a predefined criteria).

Upon triggering of latency monitor 111, latency monitor 111 launches a thread on each NUMA node to perform reads using conventional techniques that will bypass the LLC, on a number of memory pages from the local NUMA node (step 206) and reads on a number of memory pages from each of the remote NUMA nodes (step 208). In one embodiment, the launched thread that allocates certain memory pages with a non-cacheable attribute so that the LLC is disabled for these memory pages and latencies probed on subsequent reads performed on local and remote memory will not be affected by whether or not a memory page being read is or is not cached. Then, at step 210, latency monitor 111 measures the latency of each memory access and stores the latencies in memory pages of the local NUMA node. In another embodiment, the latencies measured at all of the NUMA nodes are stored centrally in a designated NUMA node.

Figure 3:
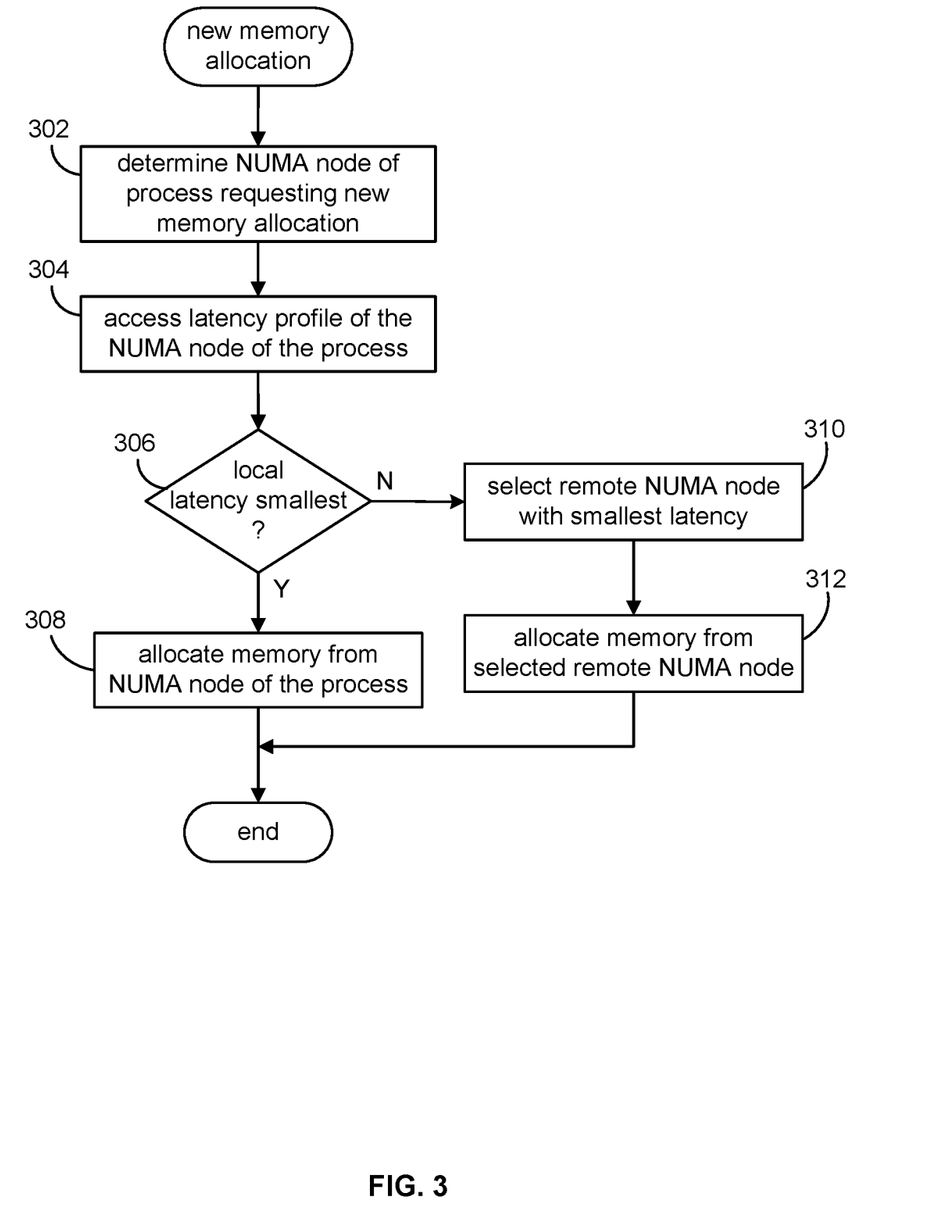
FIG. 3 depicts a flow diagram of a method for allocating memory to one of NUMA nodes based on the memory latency information, according to an embodiment.

FIG. 3 depicts a flow diagram for allocating memory to one of NUMA nodes based on the memory latency information, according to an embodiment. When an application, e.g., a virtual machine, requests memory allocation, memory allocator 112, at step 302, determines the NUMA node in which the application is executing. Then, at step 304, memory allocator 112 checks the memory latency information stored locally at the NUMA node to determine at step 306 whether or not the latency to local memory is the smallest. If the latency to local memory is the smallest, memory allocator 112 allocates from the local NUMA node (step 308). On the other hand, if the latency to local memory is not the smallest, memory allocator 112 selects the NUMA node with the smallest latency at step 310, and allocates memory from the selected NUMA node at step 312.

In some embodiments, the check performed by memory allocator 112 at step 306 is modified to require a threshold latency gap between local memory access latency and remote memory access latency so as to control the aggressiveness of remote page allocation. In addition, the percentage or the number of memory pages of new memory allocated from the remote node may be determined based on this latency gap, such that the percentage or the number of memory pages of new memory allocated from the remote node increases with an increase in the latency gap.

It should be recognized that the new allocation based on the latency profile may not be sufficient to optimize memory access latencies because memory contention at the different NUMA nodes changes dynamically. Also, some applications access memory that was allocated in a different time span, which means that the memory contention at the time of allocation is different the memory contention at access time. The NUMA scheduler module is triggered periodically to redistribute memory between NUMA nodes using memory rebalancer 113 or to migrate processes and memory pages associated therewith between NUMA nodes using compute rebalancer 114, to achieve a better balance of the memory access latencies.

Figure 4:
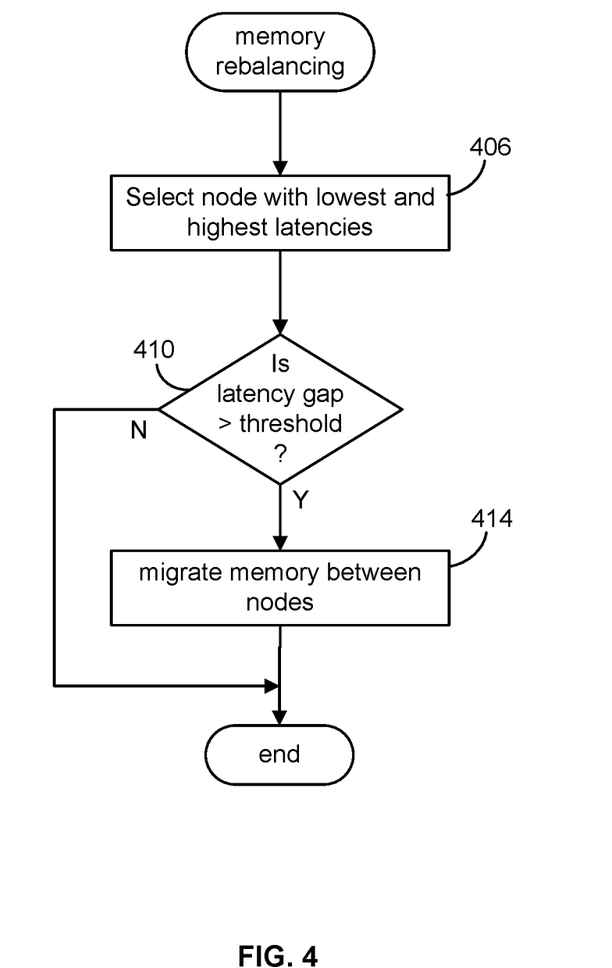
FIG. 4 depicts a flow diagram of a method for migrating memory pages between NUMA nodes based on the memory latency information, according to an embodiment.

FIG. 4 depicts a flow diagram of a method for migrating memory pages between NUMA nodes based on the memory latency information, according to an embodiment. When the NUMA scheduler module triggers memory rebalancer 113, memory rebalancer 113 launches a thread at each NUMA node (one at a time) to carry out the method of FIG. 4. The method begins at step 406, where the memory rebalancing thread accesses the memory latency information stored locally at the NUMA node and selects a first node (local or remote) with the lowest latency and a second node (local or remote) with the highest latency. The cost of memory rebalancing is not trivial so the memory rebalancing thread at step 410 checks to see if the latency gap between the two nodes is greater than a threshold latency. If so, the memory rebalancing thread at step 414 migrates memory pages from the second (highest latency) node to the first node (lowest latency node), and the process ends. If the latency gap is determined to be less than or equal to the threshold latency, the process ends.

In one embodiment, memory rebalancer 113 triggers latency monitor 111 to recalculate the latency profile at a NUMA node after memory rebalancing has been performed on that NUMA node so that the next time the memory rebalancing thread is launched at that NUMA node, the updated latency profile is used. In addition, the threshold latency gap may be set so as to control the aggressiveness of migrating memory between NUMA nodes. Further, the total number of memory pages migrated (T) may be controlled to be in proportion to the latency gap. In one embodiment, the selection of the T memory pages to be migrated is random. In another embodiment, the selection of the T memory pages to be migrated is distributed across processes running on the processors of the local NUMA node for which memory rebalancing is being carried out. If there are N processes running on the processors of the local NUMA node, the migration target becomes T/N for each process. Instead of dividing by N, alternative embodiments may use the ratio of the memory size of the process (M) over the total memory size on the local NUMA node (TotalMem), such that the migration target becomes T*(M/TotalMem) for each process. Another variation is to distribute the migration target per process based on the memory intensity of that process relative to the total memory intensity, where any of the known methods may be applied to compute the memory intensity of a process. For example, memory intensity may be determined as the number of memory accesses per unit time or instructions retired.

Figure 5:
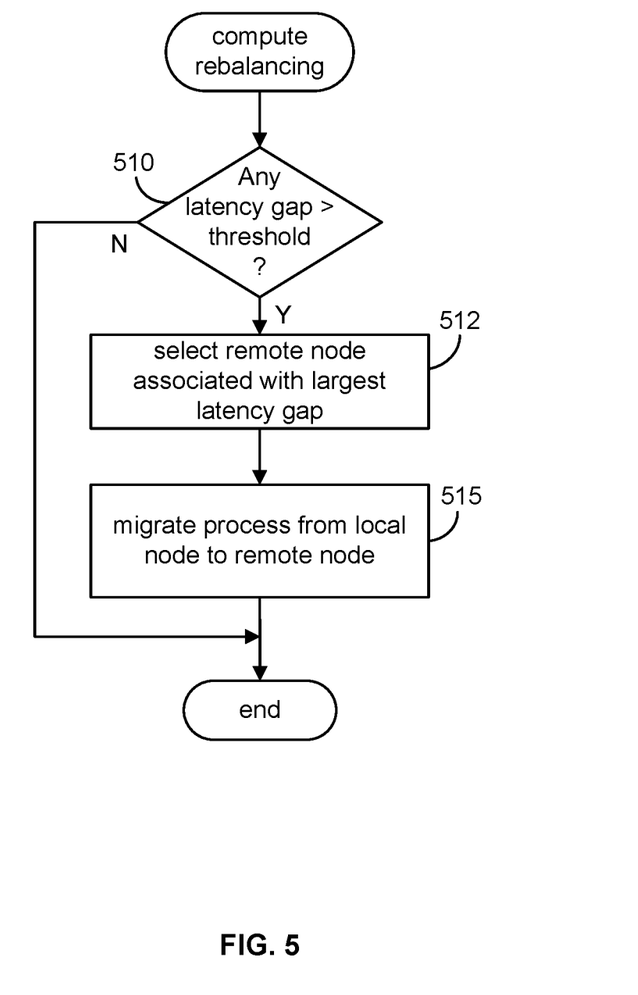
FIG. 5 depicts a flow diagram of a method for migrating processes between NUMA nodes based on the memory latency information, according to an embodiment.

In some embodiments, prior to triggering memory rebalancer 113, compute rebalancer 114 is triggered to execute the method of FIG. 5. FIG. 5 depicts a flow diagram of a method for migrating processes between NUMA nodes based on the memory latency information, according to an embodiment.

Compute rebalancer 114 at step 510 checks to see if there is a NUMA node at which local memory access latency is greater than a remote memory access latency by a threshold latency. The check is performed using the memory latency information stored locally at the NUMA node. If so, compute rebalancer 114 at step 512 selects the remote NUMA node associated with the largest latency gap, and at step 514 migrates one or more processes running on the local NUMA node to the remote NUMA node. The process ends if there is no NUMA node at which local memory access latency is greater than a remote memory access latency by the threshold latency, and after step 514.

The latency gap between local NUMA node and the remote NUMA node guides how many (and which) processes should be moved. Better decisions can be made by using per-process memory intensity information. If the latency gap is large, the process with higher memory intensity is migrated. In some situations, it is possible that the memory intensity of a process is too high and migrating that process creates a latency gap greater than the threshold at the other node. In such a case, the process with lower memory intensity should be migrated or if there is no such process is available, the memory rebalancing of FIG. 4 should be carried out.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a computer system having multiple memory proximity domains including a first memory proximity domain with a first processor, a first memory controller, and a first memory, and a second memory proximity domain with a second processor, a second memory controller, and a second memory, a method of managing placement of memory pages associated with a process in one of the memory proximity domains, said method comprising:
    reading memory pages by the first processor from the first memory using the first memory controller and not the second memory controller;
    reading memory pages by the first processor from the second memory using the first memory controller and the second memory controller;
    measuring, by a latency monitor, (1) a first one or more latencies of memory reads during the reading of memory pages by the first processor from the first memory using the first memory controller and not the second memory controller, and (2) a second one or more latencies of memory reads during the reading of memory pages by the first processor from the second memory using the first memory controller and the second memory controller;
    comparing the measured first one or more latencies to the measured second one or more latencies; and
    based on the comparing, placing memory pages into the second memory proximity domain, wherein the placed memory pages are associated with a first process running on the first processor, so that after said placing, the first process is accessing the memory pages from the second memory during execution.

2. The method of claim 1, further comprising:
    determining that the first one or more latencies is greater than the second one or more latencies,
    wherein responsive to the determining, the memory pages associated with the first process are placed in the second memory proximity domain.

3. The method of claim 2, wherein placing the memory pages associated with the first process running on the first processor in the second memory proximity domain includes allocating new memory pages for the first process in the second memory.

4. The method of claim 3, wherein placing the memory pages associated with the first process running on the first processor in the second memory proximity domain further includes copying contents from old memory pages in the first memory to the new memory pages in the second memory and deallocating the old memory pages in the first memory.

5. The method of claim 4, wherein an amount of new memory pages allocated in the second memory is increased in proportion to a difference between the first one or more latencies and the second one or more latencies.

6. The method of claim 4, wherein the old memory pages represent a subset of all memory pages allocated for the first process in the first memory and are selected randomly.

7. The method of claim 1, wherein the first and second one or more latencies are measured periodically and the measured latencies are stored in the first memory or the second memory, and the memory pages associated with the first process are placed in the second memory proximity domain based on the measured latencies stored in the first memory or the second memory.

8. The method of claim 7, further comprising:
    even after the memory pages associated with the first process are placed in the second memory proximity domain, determining that memory contention in the first memory proximity domain is higher than in the second memory proximity domain based on the stored measured latencies; and
    responsive to the determining, migrating memory pages associated with another process running on the first processor to the second memory proximity domain.

9. The method of claim 7, further comprising:
even after the memory pages associated with the first process are placed in the second memory proximity domain, determining that memory contention in the first memory proximity domain is higher than in the second memory proximity domain based on the stored measured latencies,
responsive to the determining, migrating another process running on the first processor and memory pages associated therewith to the second memory proximity domain.

10. The method of claim 1, wherein the read memory pages are non-cacheable.

11. A non-transitory computer readable medium comprising instructions to be executed in a computer system having multiple memory proximity domains including a first memory proximity domain with a first processor, a first memory controller, and a first memory and a second memory proximity domain with a second processor, a second memory controller, and a second memory, wherein the instructions when executed in the computer system, cause the computer system to perform a method of managing placement of memory pages associated with a process in one of the memory proximity domains, said method comprising:
reading memory pages by the first processor from the first memory using the first memory controller and not the second memory controller;
reading memory pages by the first processor from the second memory using the first memory controller and the second memory controller;
measuring, by a latency monitor, (1) a first one or more latencies of memory reads during the reading of memory pages by the first processor from the first memory using the first memory controller and not the second memory controller, and (2) a second one or more latencies of memory reads during the reading of memory pages by the first processor from the second memory using the first memory controller and the second memory controller;
comparing the measured first one or more latencies to the measured second one or more latencies; and
based on the comparing, placing memory pages into the second memory proximity domain, wherein the placed memory pages are associated with a first process running on the first processor, so that after said placing, the first process is accessing the memory pages from the second memory during execution.

12. The non-transitory computer readable medium of claim 11, wherein the method further comprises:
determining that the first one or more latencies is greater than the second one or more latencies,
wherein responsive to the determining, the memory pages associated with the first process are placed in the second memory proximity domain.

13. The non-transitory computer readable medium of claim 12, wherein placing the memory pages associated with the first process running on the first processor in the second memory proximity domain includes allocating new memory pages for the first process in the second memory.

14. The non-transitory computer readable medium of claim 13, wherein placing the memory pages associated with the first process running on the first processor in the second memory proximity domain further includes copying contents from old memory pages in the first memory to the new memory pages in the second memory and deallocating the old memory pages in the first memory.

15. The non-transitory computer readable medium of claim 14, wherein an amount of new memory pages allocated in the second memory is increased in proportion to a difference between the first one or more latencies and the second one or more latencies.

16. The non-transitory computer readable medium of claim 14, wherein the old memory pages represent a subset of all memory pages allocated for the first process in the first memory and are selected randomly.

17. The non-transitory computer readable medium of claim 11, wherein the first and second one or more latencies are measured periodically and the measured latencies are stored in the first memory or the second memory, and the memory pages associated with the first process are placed in the second memory proximity domain based on the measured latencies stored in the first memory or the second memory.

18. The non-transitory computer readable medium of claim 11, wherein the read memory pages are non-cacheable.

19. A computer system having multiple memory proximity domains including a first memory proximity domain with a first processor, a first memory controller, and a first memory, and a second memory proximity domain with a second processor, a second memory controller, and a second memory, wherein system software for the computer system is programmed to execute a method of managing placement of memory pages associated with a process in one of the memory proximity domains, said method comprising:
reading memory pages by the first processor from the first memory using the first memory controller and not the second memory controller;
reading memory pages by the first processor from the second memory using the first memory controller and the second memory controller;
measuring, by a latency monitor, (1) a first one or more latencies of memory reads during the reading of memory pages by the first processor from the first memory using the first memory controller and not the second memory controller, and (2) a second one or more latencies of memory reads during the reading of memory pages by the first processor from the second memory using the first memory controller and the second memory controller;
comparing the measured first one or more latencies to the measured second one or more latencies; and
based on the comparing, placing memory pages into the second memory proximity domain, wherein the placed memory pages are associated with a first process running on the first processor, so that after said placing, the first process is accessing the memory pages from the second memory during execution.

20. The computer system of claim 19, wherein the method further comprises:
even after the memory pages associated with the first process are placed in the second memory proximity domain, determining that memory contention in the first memory proximity domain is higher than in the second memory proximity domain based on the stored measured latencies,
wherein responsive to the determining, either migrating memory pages associated with another process running on the first processor to the second memory proximity domain, or migrating another process running on the first processor and memory pages associated therewith to the second memory proximity domain.

* * * * *